United States Patent [19]

Fleshman

[11] 4,030,691

[45] June 21, 1977

[54] NIGHT FISHING RIG

[76] Inventor: John F. Fleshman, 680 Golden Gate Pt., Sarasota, Fla. 33577

[22] Filed: July 16, 1976

[21] Appl. No.: 706,042

[52] U.S. Cl. .................. 248/225.3; 248/226.4; 248/316 A

[51] Int. Cl.² .................. A47B 73/00; A47B 23/00

[58] Field of Search ....... 248/226 R, 226 A, 226 B, 248/226 C, 316 A, 278, 279, 124, 276, 285, 316 C; 24/248 BC, 248 SA, 249 LS

[56] References Cited

UNITED STATES PATENTS

| 543,328 | 7/1895 | Bertels | 248/278 |
|---|---|---|---|
| 1,013,734 | 1/1912 | Boyd | 248/278 X |
| 1,329,395 | 2/1920 | Gamlin | 248/226 B X |
| 1,831,341 | 11/1931 | Bush et al. | 248/124 X |
| 1,930,993 | 10/1933 | Blodgett | 248/226 A |
| 2,281,234 | 4/1942 | Clark et al. | 248/279 X |
| 2,315,260 | 3/1943 | Lancaster | 248/279 X |
| 2,430,161 | 11/1947 | Csencsics | 248/226 A |
| 2,703,265 | 3/1955 | Wolfe | 248/226 B X |
| 2,827,253 | 3/1958 | Nelson | 248/316 A X |

FOREIGN PATENTS OR APPLICATIONS 23,010 10/1893 United Kingdom ............ 248/226 B

*Primary Examiner*—J. Franklin Foss
*Attorney, Agent, or Firm*—Fidelman, Wolffe & Waldron

[57] ABSTRACT

Sliding, pivoting and rotating connectors in a night fishing rig provide four degrees of freedom in positioning the lantern. Adjustable mount provides attachment without modification to side of boat.

5 Claims, 6 Drawing Figures

U.S. Patent    June 21, 1977    Sheet 2 of 3    4,030,691
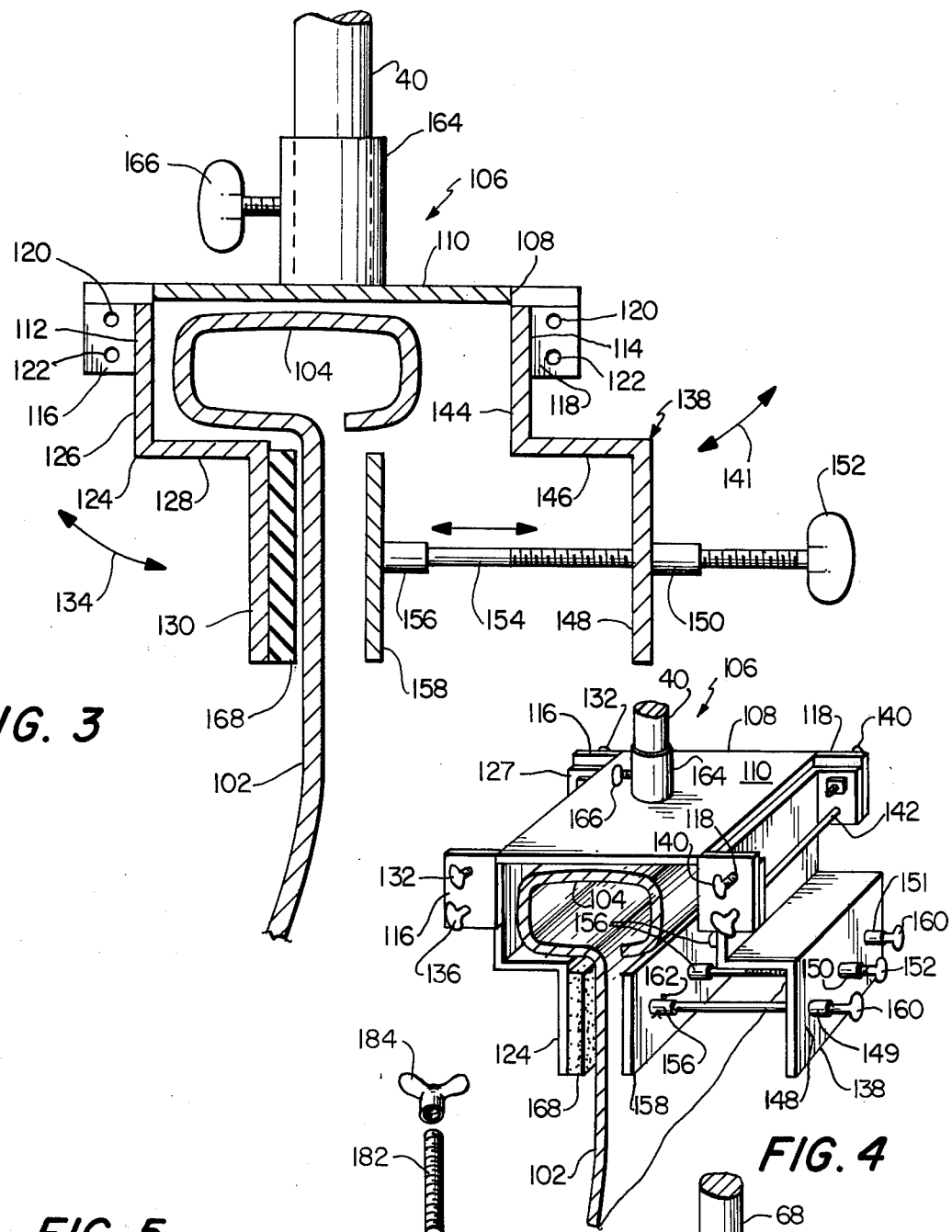
FIG. 3
FIG. 4
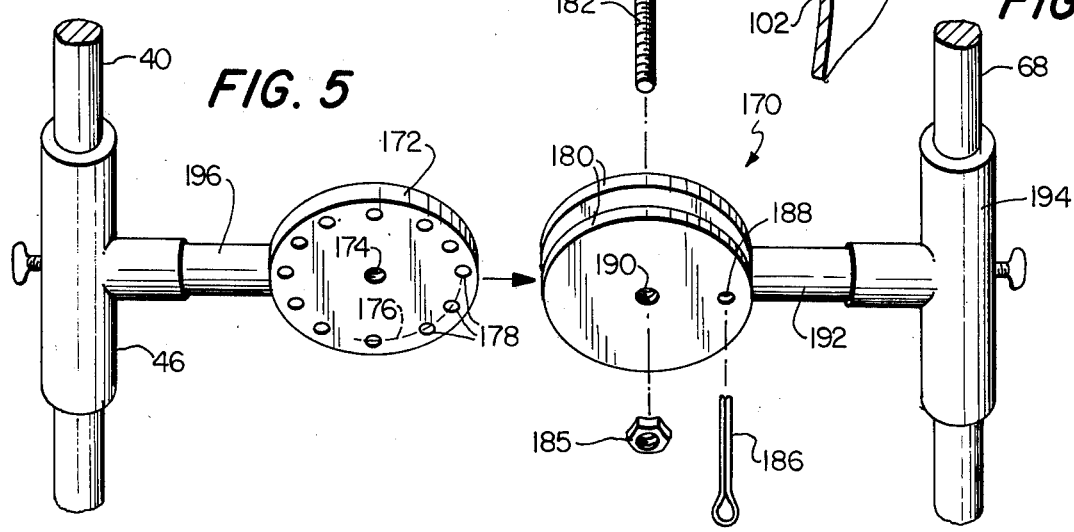
FIG. 5

NIGHT FISHING RIG

BACKGROUND OF THE INVENTION

The present invention relates to a boat lantern and, more particularly, to a rig for night fishing. It is well known that fish and shrimp are attracted to a light shining on the water and night fishing is popular with fishermen and sportsmen. Unfortunately, many of the lights available for small boats are not designed for the purpose of night fishing and must be adapted by improvisation to night fishing. This results in ineffective utilization of the light, difficulty in achieving the desired position of the light, and frequent loss of equipment in the water.

What is needed is a night fishing rig to support a lantern which is low in cost, simple to attach to the boat and provides simple and adjustable positioning of a light relative to the water after attachment.

SUMMARY OF THE INVENTION

The fishing rig of this invention has either permanent or temporary attachment to the boat; and by means of a plurality of interconnected rotating, sliding and pivoting members provides four degrees of freedom in positioning the light over the water, and accommodation for lanterns of different sizes.

OBJECTS OF THE INVENTION

An object of the present invention is to provide a lantern-holding fishing rig which is simple to attach to a boat.

Another object of this invention is to provide a fishing rig which allows simple adjustment in position of a lantern over the water.

Yet another object of this invention is to allow a plurality of adjustments in light position.

An additional object of this invention is to provide a mounting means which requires no permanent modification to the boat itself.

Still another object of this invention is to provide a fishing rig which adjusts to hold lanterns of different sizes.

A further object of this invention is to provide a fishing rig which is inexpensive to fabricate and easy to assemble.

Other objects, advantages and novel features of the present invention will become apparent from the following detailed description of the invention when considered in conjunction with the accompanying drawing in which:

FIG. 3 is a partial sectional view in elevation, to an enlarged scale, of an alternative attachment means, with parts ommitted, for a fishing rig similar to that of FIG. 1.

FIG. 4 is a perspective view of the attachment means of FIG. 3.

FIG. 5 is an exploded perspective view of alternative pivoting means for the fishing rig of FIG. 1.

Figure 1:
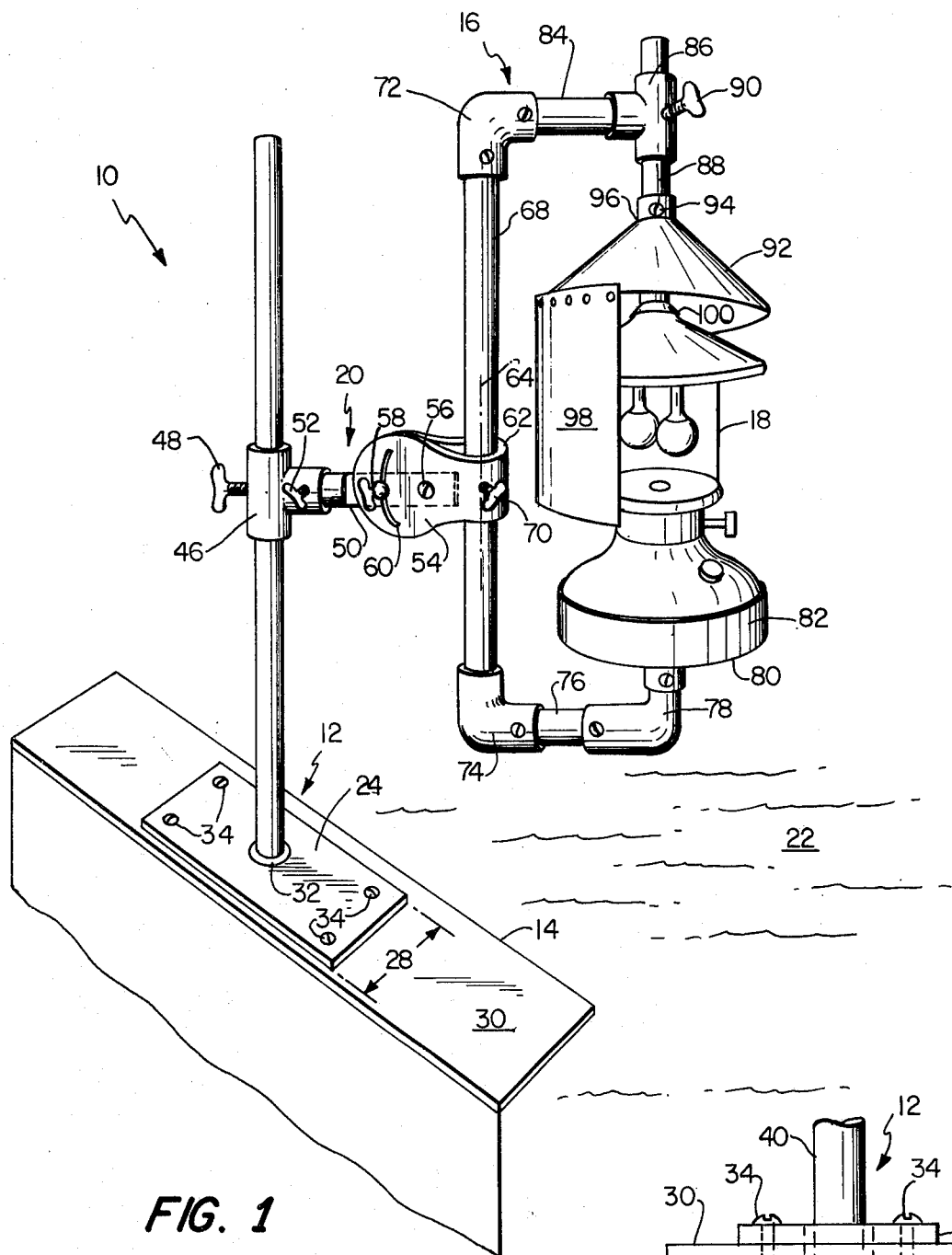
FIG. 1 is a perspective view of the night fishing rig of this invention with a lantern in place.
Figure 2:
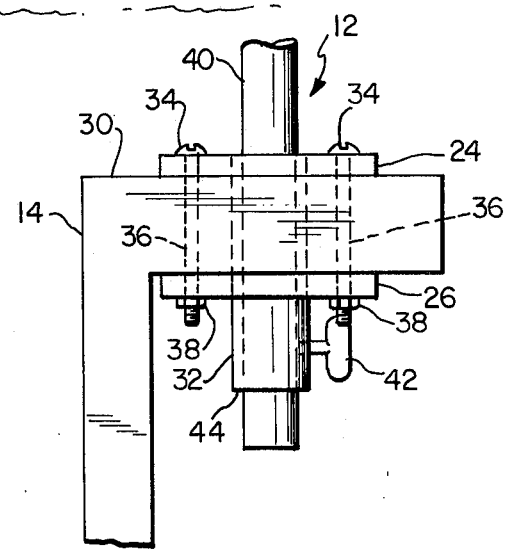
FIG. 2 is a partial sectional view in elevation, to an enlarged scale, of the attachment means for the fishing rig of FIG. 1.

As illustrated in FIGS. 1 and 2, the night fishing rig 10 of this invention is comprised of a boat mount assembly 12 which attaches the rig 10 to the gun-wale 14 of an open boat; a lamp holder assembly 16 which constrains an oil lantern 18 and a support assembly 20 intermediate to the mount assembly 12 and the lamp holder assembly 16. Swivel joints and thumb-screw clamps used in assembling the rig 10 allow a plurality of degrees of freedom in positioning the lantern 18 over the surface 22 of the water.

The boat mount assembly 12 is comprised of a pair of generally flat, equal-sized rigid plates 24, 26, e.g., steel, having a width 28 approximately equaling the width of the gun-wale 14 and located one above and one below the horizontal surface 30 of the gun-wale 14. A rigid tube 32 passes through a central hole in the plates 24, 26 and depends from the upper plate 24 with the upper end of the tube substantially flush with and fixedly attached to the upper plate 24. The plates 24, 26 attach to the gun-wale 14 by means of bolts 34 passing through aligned holes 36 in the corners of the plates 24, 26 and held by nut fasteners 38. The gun-wale 14 is adapted to be sandwiched between the flat plates 24, 26 by incorporation therein of aligned holes in the horizontal outward-extending surface 30. The lengths of the central tube 32 and of the bolts 34 permit adjustment to accommodate gun-wales of differing thicknesses.

The support assembly 20 is comprised of a round elongated vertical tube 40 which telescopes within the central tube 32 of the flat plate 24 attached to the gun-wale 14. A thumb set screw 42 threaded transversely through the central tube 32 near the lower end 44 thereof adjustably seats against and locks the vertical tube 40 in position with the vertical tube 40 extending substantially above the gun-wale 14. The coaxial ends of a tubular tee 46, e.g., a pipe tee, slide over the vertical tube 40 and a thumb set screw 48 threaded through the tee 46 adjustably seats against the vertical tube 40. A flattened rod 50 with vertically oriented flat surfaces extends from the horizontal outlet of the tee 46 and a thumb set screw 52 secures the rod 50 within the tee 46. A swivel plate 54 attaches pivotably to the flattened rod 50 by means of a headed pin 56; and the swivel plate 54 is angularly positioned by tightening thumb tabs on the head of a bolt 58 passing through an arcuate slot 60 in the swivel plate 54 and engaging a threaded hole (not shown) in the flattened rod 50.

The swivel plate 54 extends away from the flattened rod 50 and terminates in a tubular collar 62 having its longitudinal axis 64, when swiveled, in a plane always parallel to the flat surfaces of the flattened rod 50.

The lamp holder assembly 16 is comprised of a vertical tube 68 passed through the swivel collar 62 and adjustably fastened by a thumb set screw 70 threaded through the collar 62. Ells 72, 74 attach to the ends of the vertical tube 68. A short tube 76 extends from the horizontal opening of the lower ell 74 and is joined to an upward pointing ell 78. A circular platform 80 having an integral peripheral skirt 82 rising a short distance therefrom, e.g. 1½ inches high, attaches to the upward pointing ell 78 and provides a constraining seat for a lantern 18 of the conventional type.

A short rigidly connected tube 84 extends from the horizontal opening of the upper ell 72 and is fixedly joined to the horizontal stem of a tee connector 86. A vertical tube 88 passes through the aligned arms of the tee 86 and is adjustably secured vertically and rotationally by a thumb set screw 90 threaded through the tee 86. A circular, generally conical hollow guard 92 is slidably and rotatably positioned on the vertical tube 88 and is adjustably secured by a set screw 94 passing through the guard 92 near the apex 96 of the cone and engaging the vertical tube 88. A semi-circular skirt 98 depends from the guard 92 and provides a protective eye shield for the fisherman. The lower end 100 of the vertical tube 88 is flared and mates with and caps the lamp top (FIG. 1) to provide stable containment of the lantern 18 between the platform 80 at the bottom and the flared tube 88 at the top.

In use of the night fishing rig 10 of this invention, the height and angle of the lantern 18 relative to the gunwale 14 is controlled by either or both the swivel plate collar 62 and setscrew 70 or the support assembly tee 46 and set screw 48. The angle of the lantern 18 relative to the water 22 is determined by the setting of the swivel plate 54 and its locking screw 58. The spacing between platform 80 and flared tube 88 accommodates the height of the lantern 18 by means of the sliding connection between flared tube 88 and the tee 86, secured by the set screw 90. Thus, 4° of freedom are available in adjustment of the lantern 18. (The boat provides two additional degrees of freedom.)

An alternative embodiment (FIGS. 3, 4) of this invention is adapted for installation on fiber glass boats having a relatively thin outer shell 102 and a rolled-over flange 104 at the upper edge. In this alternative embodiment, the boat mounting assembly 106, in the nature of a hinged C clamp, is comprised of a base in the shape of a rectangular channel 108 resting atop the rolled-over flange 104 with the channel web 110 horizontal and the channel legs 112, 114 depending vertically, one on either side of the boat flange 104. Flanges 116, 118 extending perpendicularly away from the web 110, attach one at each end of the channel legs 112, 114 and each flange 116, 118 has two vertically aligned holes 120, 122 passing therethrough. A generally Z shaped member 124 attaches between the flanges 116 of the outer leg 112 (left side, FIG. 3) of the channel 110. The Z shaped member 124 includes: a vertical surface 126 with right angle end flanges 127 having a pair of holes which align with the holes 120, 122 in the channel flanges 116 when the Z member 124 nests between the channel flanges 116; a horizontal surface 128 extending inwardly toward the opposite channel leg 114; and a second vertical surface 130 depending from the aforementioned horizontal surface 128, this second surface 130 lying substantially parallel with the vertical side wall 102 of the boat (FIG. 3). A pair of bolts 132 with thumb tabs and nut fasteners at opposite ends of the outside leg 112 rotatably join the channel 108 to the Z member 124, which rests within the flanges 116 of the leg 112. The bolts 132 pass through the upper aligned holes 120 in the flanges 116 allowing the Z member 124 to pivot outwardly as indicated by the arrow 134. When the mounting assembly 106 is fixed in place on the boat, a bolt 136 of extended length passes continuously through the lower flange holes 122 in the leg 112 and Z member 124 and prevents pivoting of the Z member 124.

An offset member 138 is similarly attached to the right side flanges 118 of the channel 108, being held for pivoting outwardly as indicated by the arrow 141, by the two upper bolts 140 and locked in position by the positioning of the extended bolt 142 which rigidizes the assembly of the offset member 138 to the channel 108.

The offset member 138 has a vertical flanged surface 144 joined to a horizontal surface 146 extending away from the leg 114 and a vertical surface 148, generally parallel to the side 102 of the boat, depending from the aforementioned horizontal surface 146.

A trio of aligned bosses 149, 150, 151 are fixedly attached to the vertical surface 148; the central boss 150 provides a threaded hole passing through the vertical surface 148 wherethrough a bolt 152 with thumb tabs at the head and unthreaded at the end 154 extends to engage an unthreaded socket 156 fixedly attached to a vertical pressure plate 158. The distance between the pressure plate 158 and the offset member 138 is adjustably determined by turning the thumb tab bolt 152.

Each outside boss 149, 151 on the vertical offset surface 148 provides a sliding clearance hole for a shaft 160 with tabs, extending therethrough to engage an unthreaded socket 156 integral with the pressure plate 158. The shafts 160 are fixedly attached in the sockets 156 by means of cotter pins 162, and provide generally for alignment of the pressure plate 158 with the offset member 138 when the adjustment bolt 152 is turned.

On the top surface 110 of the channel, in this alternative embodiment, an integral collar 164 with set screw 166 is provided to receive the vertical tube 40 of the support assembly 20 and lantern holder assembly 16 which are as described above.

In use of this alternative boat mount assembly 106, the extended bolts 136, 142 are removed allowing the Z member 124 and offset member 138 to pivot outwardly from the channel 108. The channel 108 is then rested atop the rolled-over flange 104 of the boat side 102 without any interference between boat and mounting assembly 106. Then, the Z member 124 and offset member 138 are pivoted downward and locked in place by reinsertion of the extended bolts 136, 142. Finally, the thumb tabs of the offset bolt 152 are turned to bring the pressure plate 158 into firm engagement with the vertical surface of the boat's side 102. A semi-hard rubber pad 168 attached to the Z member 124 accommodates for roughness in the boat's surface and provides for a firm engagement. No holes are made in the boat for installation using this mounting assembly 106.

In an alternative embodiment (FIG. 5) an indexing mechanism 170 is interposed between the vertical tube 40 and the tube 68 of the lamp holder assembly 16. The indexing mechanism 170 includes a flat circular disk 172 having a centered hole 174 therethrough and a circle 176 of holes 178 therethrough concentrically and equally spaced around the central hole 174. The disk 172 rests between the two arms 180 of a U-shaped yoke and rotates about its center 174 on a headed pin 182 with a threaded end passed through the yoke arms 180 and the central hole 174 in the disk 172. Nuts 184, 185 engaging the pin 182 retain the disk 172. A key pin 186, removably inserted in a hole 188 through the yoke arms 180 and located away from the central hole 190 by a distance equalling the radius of the hole circle 176, retains the disk 172 at any desired incremental angular position in relation to the yoke. The yoke shaft 192 connects to the tee 194 which receives the tube 68 of the lamp holder assembly 16 (FIG. 1) and an integral handle 196 connects the disk 172 to the tee 46 on the support assembly 20.

Figure 6:
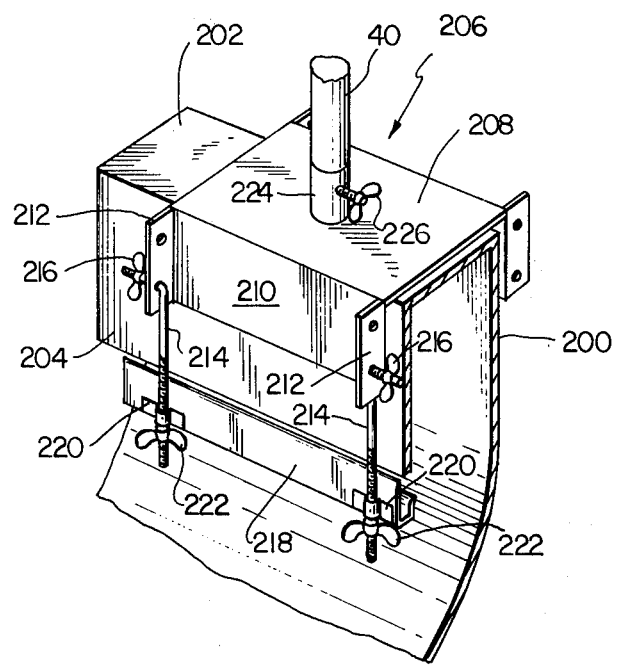
FIG. 6 is a perspective view of an alternative mounting means.

Another alternative embodiment (FIG. 6) of this invention is suited for boats whose side wall 200 terminates at the top in a channel-shape having a flat horizontal surface 202 and an inner depending vertical surface 204. In this embodiment the boat mounting assembly 206 is comprised of a channel 208 straddling the boat wall with one downwardly extended flange outside the boat, and the other flange 210 within the boat. End tabs 212 with holes therethrough, extend perpendicularly from the inner flange surface 210. A pair of L shaped threaded rods 214 are pivotably secured by wing nuts 216 to the end tabs 212 and depend within the boat. A channel 218 with legs extending upward is slidably associated with said L rods 214 by means of tunnel brackets 220 attached to the channel 218 which guide the L rods and by wing nuts 222 which vertically constrain the channel 218. In use the lower channel 218 embraces the inner boat surface 204 at its lower edge and is held in position by tightening of the wing nuts 222. On the top surface 208 of the channel a collar 224 with set screw 226 is provided to receive the vertical tube 40 of the support assembly 20 and lantern holder assembly 16 as described above.

What is claimed is:

1. An apparatus for a boat to support a lantern over the water for night fishing comprising:
   boat mounting means including: an opposed plurality of pressure plates associating with said boat and compressing a surface of said boat therebetween whereby a detachably fixed and rigid relationship is provided between said mounting means and said boat; and a removably attached vertical tube of extended length;
   lantern holding means including: a circular platform providing support and lateral constraint for said lantern; a cap for resting atop said lantern and vertically constraining said lantern, the displacement between said platform and said cap being adjustably fixed to accommodate individually a plurality of lanterns of different sizes; and
   support means to adjustably join together said boat mounting means and said lantern holding means including: a sliding and rotating connector for adjustably attaching to said vertical tube of extended length whereby said lantern holding means may be vertically elevated or lowered and horizontally rotated; a horizontal extension rotatably and detachably fastened at one end to said sliding and rotating connector whereby said lantern holding means may be vertically rotated; and pivoting means pivotally and adjustably attached at one side to the other end of said horizontal extension and, at the other side, slidably and adjustably fastened to said lantern holding means whereby said lantern holding means may be pivoted and translated relative to said vertical tube of extended length.

2. The apparatus of claim 1 wherein said pressure plates are horizontal and include a central tube integral with and depending from the upper of said plates, said central tube extending through an opening in the lower of said plates; and said vertical tube of extended length telescopes within, and is removably retained within, said central tube; and connecting means between said plates compress said boat surface between said plates.

3. The apparatus of claim 1 wherein said plates are pivotably mounted from above to a support member and releasably locked in a vertical position, said plates when vertically locked being reversibly and horizontally translatable; and said support member rests on the top of the side of said boat and one of said plates presses on the inside of said boat surface and the other one of said plates presses on the outside of said boat surface whereby various boat side thicknesses may be accommodated.

4. The apparatus of claim 1 wherein said cap includes a light shield, and said circular platform has a vertical skirt rising circumferentially therefrom whereby the base of said lantern is laterally constrained.

5. An apparatus for a boat to support a lantern over the water for night fishing, said boat having a side wall which at its top turns inwardly and downwardly, comprising:
   boat mounting means including: a first channel for resting atop said side wall of said boat, the flanges of said first channel extending downwardly; and a second channel having upwardly extended flanges for receiving therebetween said downwardly extended side wall portion; and connecting means between said first and second channel, said connecting means being adjustable whereby the spacing between said channels is varied; and a removably attached vertical tube of extended length rising from said first channel;
   lantern holding means including: a circular platform providing support and lateral constraint for said lantern; a cap for resting atop said lantern and vertically constraining said lantern, the displacement between said platform and said cap being adjustably fixed to accommodate individually a plurality of lanterns of different sizes; and
   support means to adjustably join together said boat mounting means and said lantern holding means including: a sliding and rotating connector for adjustably attaching to said vertical tube of extended length whereby said lantern holding means may be vertically elevated or lowered and horizontally rotated; a horizontal extension rotatably and detachably fastened at one end to said sliding and rotating connector whereby said lantern holding means may be vertically rotated; and pivoting means pivotally and adjustably attached at one side to the other end of said horizontal extension and, at the other side, slidably and adjustably fastened to said lantern holding means whereby said lantern holding means may be pivoted and translated relative to said vertical tube of extended length.

* * * * *